(12) United States Patent
Pantic et al.

(10) Patent No.: US 11,505,077 B2
(45) Date of Patent: Nov. 22, 2022

(54) SYSTEMS AND METHODS FOR WIRELESS VEHICLE POWER TRANSFER AND MISALIGNMENT ESTIMATION

(71) Applicants: TOYOTA MOTOR ENGINEERING & MANUFACTURING NORTH AMERICA, INC., Plano, TX (US); Utah State University, Logan, UT (US)

(72) Inventors: Zeljko Pantic, Raleigh, NC (US); Seyed Mohammad Reza Tavakoli, Raleigh, NC (US); Chungchih Chou, Ann Arbor, MI (US); Ercan Mehmet Dede, Ann Arbor, MI (US)

(73) Assignees: Toyota Motor Engineering & Manufacturing North America, Inc., Plano, TX (US); Utah State University, Logan, UT (US)

( * ) Notice: Subject to any disclaimer, the term of this patent is extended or adjusted under 35 U.S.C. 154(b) by 83 days.

(21) Appl. No.: 16/885,010

(22) Filed: May 27, 2020

(65) Prior Publication Data
US 2021/0370788 A1    Dec. 2, 2021

(51) Int. Cl.
*B60L 53/39* (2019.01)
*H02J 50/90* (2016.01)
(Continued)

(52) U.S. Cl.
CPC ............ *B60L 53/39* (2019.02); *B60G 17/017* (2013.01); *B60L 53/12* (2019.02); *B60L 53/36* (2019.02);
(Continued)

(58) Field of Classification Search
CPC .......... B60L 53/39; B60L 53/12; B60L 53/36; B60L 53/126; B60G 17/017;
(Continued)

(56) References Cited

U.S. PATENT DOCUMENTS

| 6,275,753 | B1 * | 8/2001 | Kyrtsos | ................... G01B 21/26 |
| | | | | 701/32.8 |
| 9,126,490 | B2 | 9/2015 | Cook et al. | |

(Continued)

FOREIGN PATENT DOCUMENTS

| CN | 107571753 A | 1/2018 |
| CN | 108258766 A * | 7/2018 |

(Continued)

OTHER PUBLICATIONS

Saha ,"An ANN-Based System for Lateral Misalignment and Vertical Clearance Estimation of an Electric Vehicle During Dynamic Wireless Charging," University of Utah, Aug. 2019 (Year: 2019).*

(Continued)

*Primary Examiner* — Pinping Sun
(74) *Attorney, Agent, or Firm* — Dinsmore & Shohl LLP (57) ABSTRACT

A vehicle including a power receiving pad for wirelessly receiving power, a plurality of magnetic sensors for measuring a magnetic field of a power transmitting pad and obtaining magnetic field data, one or more processors, and one or more memory modules are provided. The one or more memory modules include a computer-readable medium storing computer-readable instructions that, when executed by the one or more processors, cause the one or more processors to receive the magnetic field data from the plurality of magnetic sensors, and estimate a lateral misalignment of the power receiving pad with respect to a magnetic axis of the power transmitting pad. The magnetic sensors are arranged to detect at least an X-component and a Y-component of a magnetic field produced by a power transmitting pad.

17 Claims, 8 Drawing Sheets

(51) Int. Cl.
*H02J 50/12* (2016.01)
*B60L 53/12* (2019.01)
*B60L 53/36* (2019.01)
*B60G 17/017* (2006.01)
*G06N 3/08* (2006.01)
*H02J 7/02* (2016.01)
*B60L 53/126* (2019.01)

(52) U.S. Cl.
CPC .................. *G06N 3/08* (2013.01); *H02J 7/02* (2013.01); *H02J 50/12* (2016.02); *H02J 50/90* (2016.02); *B60G 2500/30* (2013.01); *B60L 53/126* (2019.02)

(58) Field of Classification Search
CPC ......... B60G 2500/30; G06N 3/08; H02J 7/02; H02J 50/12; H02J 50/90; H02J 2310/48; H02J 50/402
See application file for complete search history.

(56) References Cited

U.S. PATENT DOCUMENTS

| | | | |
|---|---|---|---|
| 9,404,954 | B2 | 8/2016 | Roy et al. |
| 9,656,564 | B2 | 5/2017 | Widmer et al. |
| 9,815,379 | B2 | 11/2017 | Huang et al. |
| 10,075,028 | B2 | 9/2018 | Wu et al. |
| 10,146,647 | B2 | 12/2018 | Halker et al. |
| 10,293,700 | B2 | 5/2019 | Javaid et al. |
| 10,343,535 | B2 | 7/2019 | Cook et al. |
| 10,343,551 | B2 | 7/2019 | Ahmadi et al. |
| 10,391,875 | B2 | 8/2019 | Huang et al. |
| 2005/0178632 | A1* | 8/2005 | Ross ............... B60L 7/14 191/10 |
| 2012/0262002 | A1* | 10/2012 | Widmer ............ H02J 50/20 307/104 |
| 2013/0151054 | A1* | 6/2013 | Ortmann .......... B60W 10/20 180/65.265 |
| 2013/0252375 | A1* | 9/2013 | Yi ................... H01L 24/80 438/107 |
| 2014/0111154 | A1* | 4/2014 | Roy ................. B60L 53/124 320/108 |
| 2014/0375256 | A1 | 12/2014 | Lee et al. |
| 2015/0323694 | A1* | 11/2015 | Roy ................. H02J 50/12 307/104 |
| 2016/0159233 | A1* | 6/2016 | Kim ................ B60L 53/126 320/108 |
| 2016/0172104 | A1* | 6/2016 | Mirbozorgi ........ H02J 7/025 320/108 |
| 2017/0237296 | A1* | 8/2017 | Keith .............. H02J 7/0042 307/104 |
| 2017/0294941 | A1* | 10/2017 | Long ............... H02J 7/025 |
| 2018/0062444 | A1* | 3/2018 | Steinmetz ......... H02J 7/025 |
| 2018/0356833 | A1* | 12/2018 | Öhman ............. B60L 5/005 |
| 2019/0023141 | A1* | 1/2019 | Huang .............. H02J 50/90 |
| 2019/0097471 | A1* | 3/2019 | Pantic ............. H02J 50/40 |

FOREIGN PATENT DOCUMENTS

| | | | | |
|---|---|---|---|---|
| CN | 108616170 | A * | 10/2018 | ........... H02J 50/12 |
| WO | WO-2018124669 | A1 * | 7/2018 | ........... H02J 50/80 |

OTHER PUBLICATIONS

R. Tavakoli and Z. Pantic, "ANN-based algorithm for estimation and compensation of lateral misalignment in dynamic wireless power transfer systems for EV charging," in 2017 IEEE Energy Conversion Congress and Exposition (ECCE), Oct. 2017, pp. 2602-2609 (Year: 2017).*

Tufts, "Earth's Magnetic Dipole," pp. 1 (Year: 2015).*

Rakhymbay, "Precise Analysis on Mutual Inductance Variation in Dynamic Wireless Charging of Electric Vehicle," Energies. 2018; 11(3):624, pp. 1-21 (Year: 2018).*

An Autonomous coil alignment system for the dynamic wireless charging of electric vehicles to minimize lateral misalignment (https://pdfs.semanticscholar.org/6af4/c17756a1237b47d527c2c8894b365bfd53e3.pdf), published Mar. 7, 2017, 20 pages.

Precise analysis on mutual inductance variation in dynamic wireless charging of electric vehicle (https://www.mdpi.com/1996-1073/11/3/624/htm), published Mar. 11, 2018, 21 pages.

Review of static and dynamic wireless electric vehicle charging system (https://www.sciencedirect.com/science/article/pii/S221509861830154X), 16 pages.

* cited by examiner

SYSTEMS AND METHODS FOR WIRELESS VEHICLE POWER TRANSFER AND MISALIGNMENT ESTIMATION

TECHNICAL FIELD

The present specification generally relates to charging systems and methods for dynamic wireless charging of a vehicle and, more specifically, charging systems and methods for improving the rate of wireless charging to the vehicle.

BACKGROUND

Current charging technology for electric vehicles includes directly plugging a cable into the vehicle to charge the battery. This method may take hours to fully charge the vehicle, at which time the vehicle cannot be driven. Alternatively, inductive charging of the vehicle eliminates the need for plugging a cable into the vehicle as power is wirelessly transferred between a power source and the vehicle.

Currently, there are limitations to wirelessly charging vehicles that are not stationary, such as in-motion wireless charging vehicles. Additionally, these vehicles lack the ability to accurately estimate misalignment between the vehicle and the devices wirelessly transmitting power to the vehicle, such as road-embedded power transmitting devices or pads. This misalignment can reduce the efficiency and the rate at which energy can be transmitted to the vehicle. As a result, the time required to fully charge the battery of the vehicle is increased. If the position of the vehicle relative to the wireless power transmitting pad could be appropriately adjusted, the power transferred to the vehicle can be increased and the power loss reduced.

SUMMARY

In one embodiment, a vehicle includes a power receiving pad for wirelessly receiving power, a plurality of magnetic sensors for measuring a magnetic field of a power transmitting pad and obtaining magnetic field data, one or more processors, and one or more memory modules. The one or more memory modules include a computer-readable medium storing computer-readable instructions that, when executed by the one or more processors, cause the one or more processors to receive the magnetic field data from the plurality of magnetic sensors, and estimate a lateral misalignment of the power receiving pad with respect to a magnetic axis of the power transmitting pad.

In another embodiment, a power transmitting system for dynamic power transfer includes a plurality of power transmitting pads, one or more processors, and one or more memory modules including a computer-readable medium storing computer-readable instructions that, when executed by the one or more processors, cause the one or more processors to receive magnetic field data detected by a plurality of magnetic sensors of a vehicle detecting a magnetic field of the plurality of power transmitting pads, detect a position of the vehicle relative to the magnetic field, and sequentially activate the plurality of power transmitting pads based on a position of the vehicle relative to the magnetic field.

In yet another embodiment, a method for providing dynamic wireless power transfer to a vehicle. The method includes wirelessly receiving power at a power receiving pad of a vehicle from a plurality of power transmitting pads, detecting, using a plurality of magnetic sensors, a magnetic field provided by each of the plurality of power transmitting pads to obtain magnetic field data, estimating a lateral misalignment of the power receiving pad with respect to a magnetic axis of the plurality of power transmitting pads using the magnetic field, and adjusting a position of the vehicle to account for the lateral misalignment of the power receiving pad.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Embodiments described herein are directed to vehicles, systems, and methods for estimating lateral misalignment between a power receiving system on a vehicle and a power transmitting system to improve wireless power transfer from a power source to the vehicle.

By measuring the magnetic flux density of a magnetic field produced by a wireless power transmitting pad on or in a road surface, the degree of lateral misalignment can be estimated with respect to a power receiving pad provided underneath a moving vehicle and relayed to the driver to correct the lateral misalignment. By correcting the lateral misalignment, power transfer becomes more uniform and efficient to the vehicle. In instances in which wireless power transfer is sufficiently uniform, batteries in electric vehicles may be able to be reduced in size or removed entirely as power can be continuously delivered to the vehicle via the power transmitting pads.

In machine learning, a large amount of training data is obtained and used to train a machine-learning model. In examples disclosed herein, training data may comprise historical data relating various wireless charging rates associated with both lateral misalignment and vertical offset between a power receiving pad of a vehicle and a power transmitting pad. Once a machine learning algorithm is trained, the trained model may be used to make future predictions. For example, when data is received from magnetic sensors identifying a detected magnetic field, a trained machine learning model may be used to estimate the lateral misalignment and/or the vertical offset and how the position of the vehicle may need to be adjusted to account for those estimated misalignments.

When using machine learning in this manner, a number of different machine learning models may be used. Throughout the ensuing description, embodiments of the systems and methods disclosed herein use an artificial neural network for estimating lateral misalignment and vertical offset. However, it is to be appreciated that any known or yet-to-be-developed machine learning techniques may be utilized.

Figure 1:
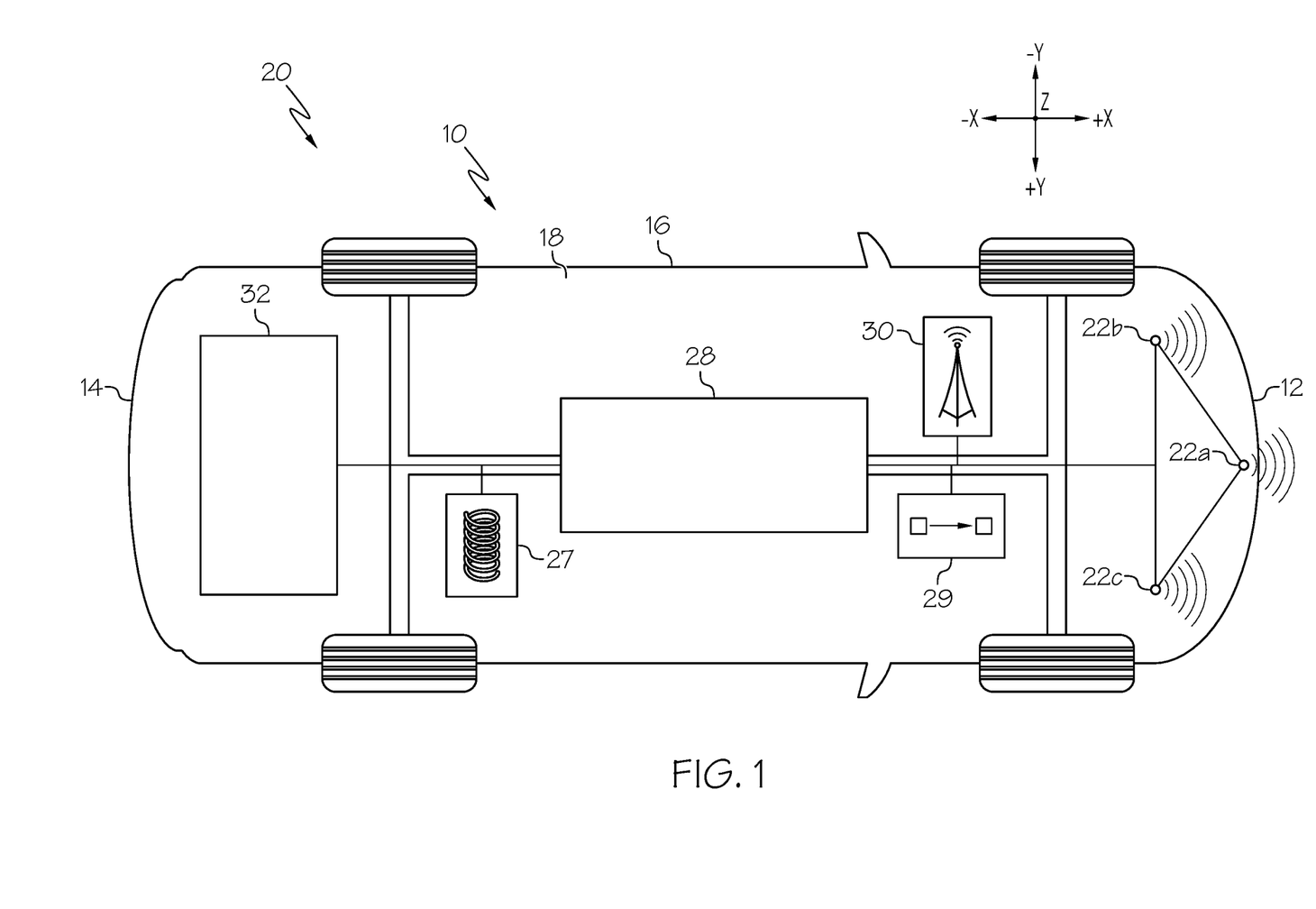
FIG. 1 schematically depicts a bottom view of a vehicle including a power receiving system according to one or more embodiments shown and described herein.

As used herein, the term "vehicle longitudinal direction" refers to the forward-rearward direction of the vehicle (i.e., in the +/− vehicle X direction depicted in FIG. 1). The term "vehicle lateral direction" refers to the cross-vehicle direction (i.e., in the +/− vehicle Y direction depicted in FIG. 1), and is transverse to the longitudinal vehicle direction. The term "vehicle vertical direction" refers to the upward-downward direction of the vehicle (i.e., in the +/− vehicle Z direction depicted in FIG. 1). As used herein, "upper" and "above" are defined as the positive Z direction of the coordinate axis shown in the drawings. "Lower" and "below" are defined as the negative Z direction of the coordinate axis shown in the drawings. Further, the terms "outboard" or "outward," as used herein refers to the relative location of a component with respect to a vehicle centerline. The term "inboard" or "inward" as used herein refers to the relative location of a component with respect to the vehicle centerline. Because the vehicle structures may be generally symmetrical about the vehicle centerline, the direction to which use of terms "inboard," "inward," "outboard" and "outward" refer may be mirrored about the vehicle centerline when evaluating components positioned along opposite sides of the vehicle.

Generally, embodiments described herein are directed to power receiving systems of a vehicle that generally include a power receiving pad for wirelessly receiving power and a plurality of magnetic sensors for detecting a magnetic field. The power receiving system may use an artificial neural network configured to estimate at least a lateral misalignment of the power receiving pad with respect to the magnetic field of a power transmitting pad. As discussed herein, in some embodiments, the artificial neural network is also configured to estimate vertical offset between the power receiving pad and the power transmitting pad. Various embodiments of the systems and the operation of the systems are described in more detail herein. Whenever possible, the same reference numerals will be used throughout the drawings to refer to the same or like parts.

Figure 2:
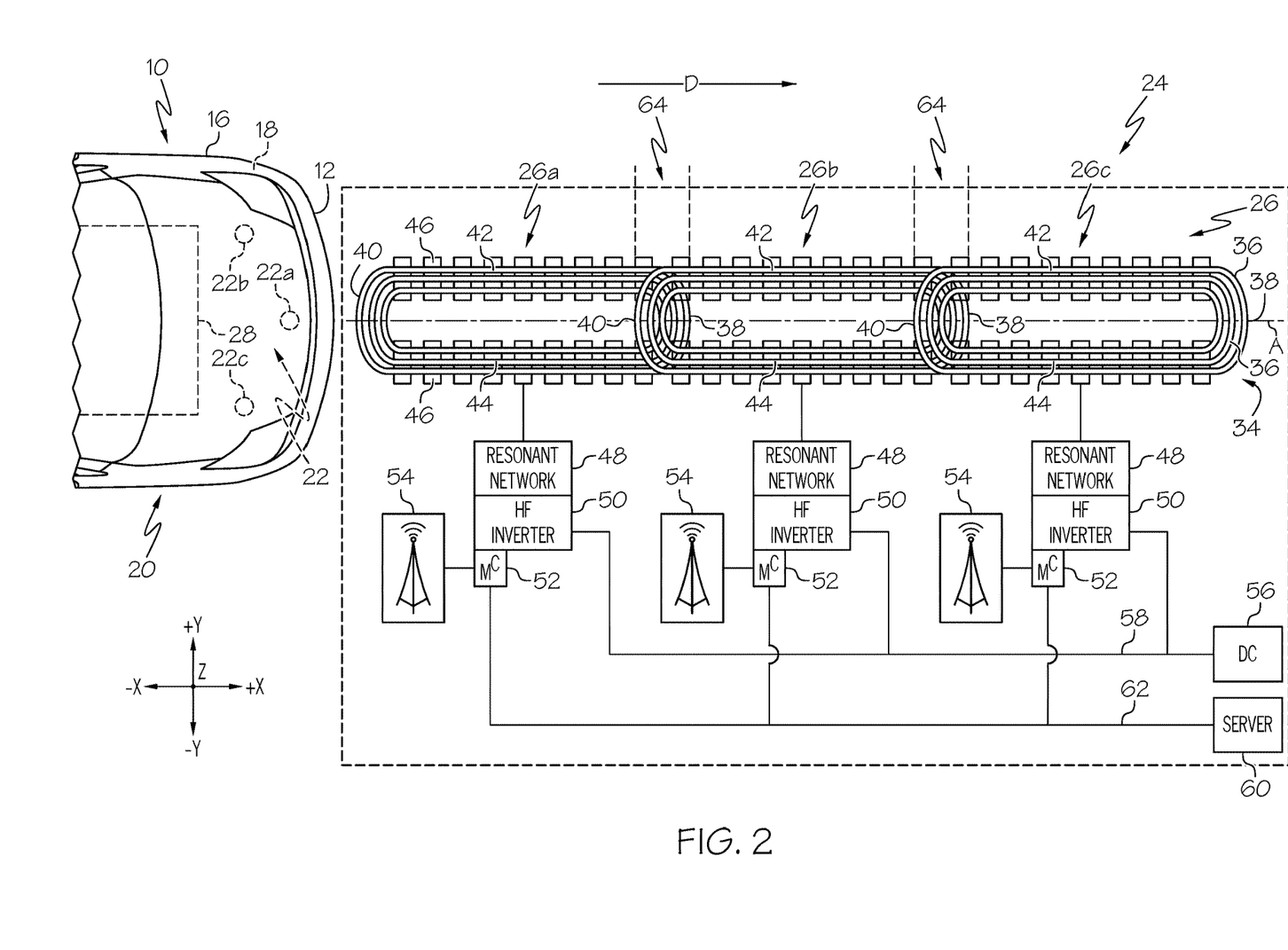
FIG. 2 schematically depicts a power transmitting system and an approaching vehicle according to one or more embodiments shown and described herein.

As shown in FIGS. 1 and 2, a vehicle 10 is shown including a front end 12, a rear end 14, and a vehicle body 16 having a bottom surface 18 extending between the front end 12 and the rear end 14 of the vehicle 10. The vehicle 10 includes a power receiving system 20 including a plurality of magnetic sensors 22 for detecting a magnetic field from a power transmitting assembly on or within a roadway, such as a power transmitting system 24 including a plurality of power transmitting pads 26 illustrated in FIG. 2 and discussed herein, and a power receiving pad 28 for wirelessly receiving power from the power transmitting system 24. The power transmitting pads may be denoted as 26 when referring to the power transmitting pads 26 generally. However, when referring to the power transmitting pads 26 individually, the power transmitting pads 26 may be denoted as a first power transmitting pad 26a, a second power transmitting pad 26b, a third power transmitting pad 26c, and the like, as shown, which are arranged in a driving direction D. While reference herein is made to the power receiving pad 28 wirelessly receiving power from the power transmitting pad 26, it is to be appreciated that the power receiving pad 28 may be capable of receiving power from any known or yet-to-be-developed embodiment of a power transmitting pad, such as an existing in-ground system. In an embodiment, a wireless charging system is provided, which includes both the power receiving system 20 and the power transmitting system 24, as disclosed herein.

The vehicle 10 includes at least two magnetic sensors 22 for detecting a magnetic field and measuring the magnetic flux density of the magnetic field provided by each power transmitting pad 26 of the power transmitting system 24. In some embodiments, as shown, the vehicle 10 includes three magnetic sensors 22. However, more than three magnetic sensors 22 may be provided. It should be appreciated that providing additional magnetic sensors 22 on the vehicle 10 results in a more accurate estimation of the location of the power transmitting pad 26 relative to the power receiving pad 28. As discussed in more detail herein, when more than two magnetic sensors 22 are employed, the speed of the vehicle 10 relative to the power transmitting pad 26 may be estimated. The magnetic sensors 22 may be any suitable magnetic field sensor devices capable of detecting the presence of a magnetic field and the specific magnitude of the magnetic field. The magnetic sensors 22 may be denoted as 22 when referring to the magnetic sensors 22 generally. However, when referring to the magnetic sensors 22 individually, the magnetic sensors 22 may be denoted as a first magnetic sensor 22a, a second magnetic sensor 22b, and a third magnetic sensor 22c, as shown.

In some embodiments, the magnetic sensors 22 are provided on the bottom surface 18 of the vehicle 10 proximate the front end 12 of the vehicle 10 so that the magnetic sensors 22 encounter the magnetic field of each power transmitting pad 26 before the power receiving pad 28. The magnetic sensors 22 may be equally spaced apart from a longitudinal axis of the vehicle and, thus, aligned with a longitudinal or magnetic axis A of the power transmitting pads 26 when positioned in the center of a lane of a road. However, in instances in which the power transmitting pads 26 are not positioned in the center of a lane, the magnetic sensors 22 may be fixedly or movably repositioned to a location of the vehicle 10 in the vehicle lateral direction along the bottom surface 18 of the vehicle 10 to align the magnetic sensors 22 with the magnetic axis A of the power transmitting pads 26 while maintaining the position of the vehicle 10 within the center of the lane. As shown, the magnetic sensors 22 are located in a triangular configuration with a first magnetic sensor 22a located in a vehicle-forward direction with respect to a second magnetic sensor 22b and a third magnetic sensor 22c. In some embodiments, the magnetic sensors 22 are symmetrically aligned with a central longitudinal axis of the power receiving pad 28.

Positioning the magnetic sensors 22 proximate the front end 12 of the vehicle 10 and spaced apart from the power receiving pad 28 allows the magnetic sensors 22 to estimate misalignment with respect to a forward power transmitting pad 26 while the power receiving pad 28 of the vehicle 10 receives power from at least one rearward power transmitting pad 26. In doing so, data from the magnetic sensors 22 may be utilized in an artificial neural network to estimate whether there is any lateral misalignment and/or a vertical offset between the vehicle 10, specifically the power receiving pad 28, and the power transmitting pad 26 so that the position of the vehicle 10 may be adjusted accordingly as it travels down the road and over subsequent power transmitting pads 26.

As noted herein, the magnetic sensors 22 are configured to detect the magnetic field, which is then used to estimate the lateral misalignment between the power receiving pad 28 and the power transmitting pads 26 with respect to the magnetic axis A of each power transmitting pad 26. As such the magnetic axis A correlates to a central axis extending through each of the power transmitting pads 26. As referred to herein, "lateral misalignment" refers to displacement in a vehicle lateral direction between the power receiving pad 28 and the magnetic axis A of the power transmitting pads 26. It should be appreciated that the rate of energy wirelessly transmitted to the vehicle 10 is greatest when the power receiving pad 28 is directly aligned with, or over, the magnetic axis A of the power transmitting pad 26, i.e., the magnetic field. Misalignment or displacement in the vehicle lateral direction may reduce the rate of energy transferred between the power receiving pad 28 and the power transmitting pad 26.

With respect to the power receiving pad 28, the power receiving pad 28 may be located on the bottom surface 18 of the vehicle body 16 of the vehicle 10. In some embodiments, similar to the magnetic sensors 22, the power receiving pad 28 may be located along the longitudinal axis of the vehicle 10 to align with a center of the power transmitting pad 26 and the magnetic field. However, as noted above, in instances in which the power transmitting pad 26 is not positioned in the center of a lane, the power receiving pad 28 may be fixedly or movably repositioned along the bottom surface 18 of the vehicle 10. In some embodiments, the power receiving pad 28 is located on the same vertical plane as at the magnetic sensors 22. The power receiving pad 26 may be any suitable wireless power receiving device, such as an inductive coil, for wirelessly receiving a charge from an inductive power transmitting pad.

Power is most efficiently transferred to the power receiving pad 28 from the power transmitting pad 26 when the vehicle 10, specifically the power receiving pad 28, is located within an optimal vertical location with respect to the magnetic field of the power transmitting pad 26. Thus, in some embodiments, the magnetic sensors 22 are also configured to detect the magnetic field and provide data to the artificial neural network to estimate a vertical offset between the power receiving pad 28 and the power transmitting pad 26. As used herein, the term "vertical offset" refers to a distance between the power receiving pad 28 and the power transmitting pad 26, which is estimated by the data acquired by the magnetic sensors 22 detecting an optimal vertical position of the power receiving pad 28 relative to the magnetic field. As a result of estimating the vertical offset, as described in more detail herein, the vehicle 10 may be adjusted to account for the vertical offset. In some embodiments, the vehicle 10 is raised or lowered to adjust the vertical position of the power receiving pad 28, for example, by adjusting the vehicle suspension 27 (FIG. 1) of the vehicle 10. In some embodiments, the power receiving pad 28 itself is raised or lowered in the vehicle vertical direction. This may require a separate assembly (not shown) for movably fixing the power receiving pad 28 to the vehicle 10. In other embodiments, the vehicle 10 may communicate with the power transmitting pad 26 via a vehicle communication device 30 to increase or decrease the power transmitted by each power transmitting pad 26 to account for the vertical offset of the approaching vehicle 10.

As noted herein, the power transmitting pads 26 may be part of an existing in-ground system configured to wirelessly transmit power from the power transmitting pads 26 to the power receiving pad 28, which in turn may be used to recharge a battery 32 of the vehicle 10 or power the vehicle 10 directly by bypassing the battery 32. In some embodiments, as shown in FIG. 2, the power transmitting system 24 is shown, including the plurality of power transmitting pads 26. Each power transmitting pad 26 may be identical in structure and, therefore, reference to one power transmitting pad 26 is applicable to each power transmitting pad 26. The power transmitting pads 26 are arranged to form a power transmitting assembly 34. Each power transmitting pad 26 includes at least one coil 36. Each power transmitting pad 26 includes a forward end 38, a rear end 40, a first side 42, and a second side 44, the sides 42, 44 extending between the forward end 38 and the rear end 40. The forward end 38 refers to a forward driving direction D when a vehicle 10 drives down a lane of a road in which the power transmitting assembly 34 is located. A plurality of connecting members 46 may be provided along the sides 42, 44 of the power transmitting pad 26. As shown, no connecting members 46 are provided at the forward end 38 and the rear end 40 of the power transmitting pad 26.

Further, each power transmitting pad 26 may include a resonant network 48, a high-frequency inverter 50, and a microcontroller 52. In some embodiments, the power transmitting pad 26 further includes a pad communication device 54 electrically connected to the microcontroller 52 for wirelessly communicating with the vehicle communication device 30 to receive instruction from the vehicle 10, and discussed herein. The power transmitting pads 26 are each connected to a power source 56 via a power line 58 for energizing the coil 36, and the microcontroller 52 of each power transmitting pad 26 may be optionally connected to a server 60 via a Control Area Network line 62. In some embodiments, the power transmitting pads 26 may be wirelessly connected to the server 60 via the pad communication device 54, thereby eliminating the need for the Control Area Network line 62. In some embodiments, the power transmitting pads 26 may receive instruction from the vehicle 10 via the server 60 as opposed to the power transmitting pad 26 directly via the pad communication device 54.

In some embodiments, the power transmitting pads 26 are linearly arranged to abut against one another at opposite front and rear ends. However, it should be appreciated that the forward end 38 and the rear end 40 of the power transmitting pads 26 provide less power than the amount of power provided along the sides 42, 44 of the power transmitting pads 26. Therefore, this may result in a discontinuity or decrease in the magnitude of the magnetic field between adjacent power transmitting pads 26. To address this deficiency, in some embodiments, the forward end 38 of at least some of the power transmitting pads 26 may overlap the rear end 40 of an immediately adjacent power transmitting pad 26, forming an overlapping region 64. This ensures that power transfer to the vehicle 10 is uniform and does not have significant variations across the power transmitting assembly 34.

Figure 3:
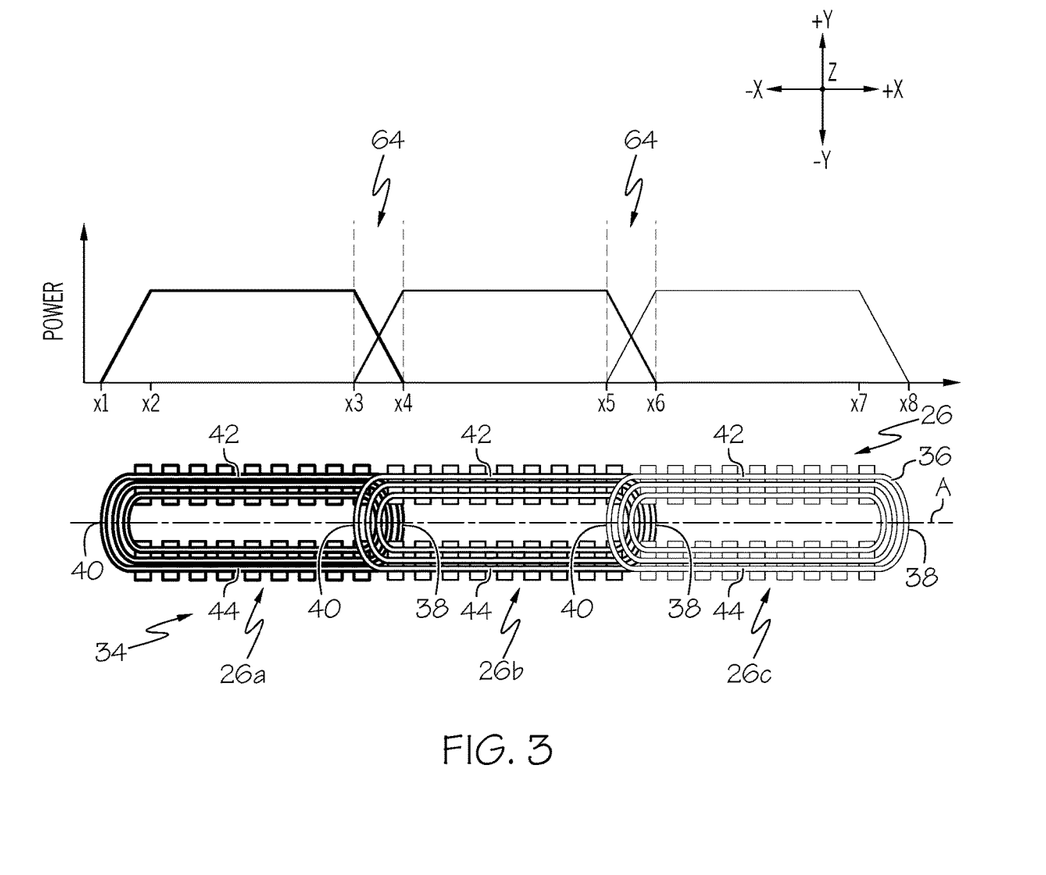
FIG. 3 schematically depicts a chart indicating individual power output of each power transmitting pad of the power transmitting system according to one or more embodiments shown and described herein.

Referring to FIG. 3, a chart indicates the power transmitted from each of the power transmitting pads 26 to the power receiving pad 28 when the vehicle 10 is moving along the length of the power transmitting assembly 34 in the vehicle-forward direction (in the +X-direction). As discussed herein below, the power transmitting pads 26 are configured to switch from a misalignment estimation mode to a power transmitting mode. In addition, the power transmitting pads 26 are configured to coordinate with one another as to when to initiate the misalignment estimation mode and switch to the power transmitting mode. Initially, each power transmitting pad 26 is deactivated. When instructed, the power transmitting pad 26 is activated into the misalignment estimation mode to generate a magnetic field which the magnetic sensors 22 detect. Subsequently, the power transmitting pad 26 switches to the power transmitting mode to transmit power to the power receiving pad 28 as the power receiving pad 28 passes over the power transmitting pad 26.

In some embodiments, the power transmitting pads 26 operate at a frequency between 2 kHz and 6 kHz when in the misalignment estimation mode. In some embodiments, the power transmitting pads 26 operate at a frequency between 4 kHz and 5 kHz when in the misalignment estimation mode. Further, in some embodiments, the power transmitting pads 26 provide a power between 3 amps and 10 amps when in the misalignment estimation mode. In some embodiments, the power transmitting pads 26 provide a power between 4 amps and 7 amps when in the misalignment estimation mode. In some embodiments, the power transmitting pads 26 operate at a frequency between 20 kHz and 100 kHz when in the power transmitting mode. In some embodiments, the power transmitting pads 26 operate at a frequency between 70 kHz and 90 kHz when in the power transmitting mode. Further, in some embodiments, the power transmitting pads 26 provide current between 40 amps and 80 amps when in the power transmitting mode.

In an example embodiment, the first power transmitting pad 26a initially receives a signal from another power transmitting pad 26, the server 60, or the vehicle 10 directly indicating that the vehicle 10 is approaching the first power transmitting pad 26a and instructing the power transmitting pad 26a to switch to the power transmitting mode. At the same time, the second transmitting pad 26b will be initiated to start the misalignment estimation mode to estimate lateral misalignment and/or the vertical offset prior to the power receiving pad 28 of the vehicle 10 passing over the second transmitting pad 26b.

As noted herein, the power of the power transmitting pad 26 is greater at the sides 42, 44 thereof. Thus, as shown, the power output of the first power transmitting pad 26a gradually increases from X1 to X2. At X2, the first power transmitting pad 26a achieves a maximum power output and maintains this power output from X2 to X3. At X3, the power output of the power transmitting pad 26a begins to decrease. At the same time, the second power transmitting pad 26b is instructed to switch from the misalignment estimation mode to the power transmitting mode to begin transmitting power to the power receiving pad 28. Thus, between X3 and X4, which defines the overlapping region 64 between the first power transmitting pad 26a and the second power transmitting pad 26b, the power provided by the first power transmitting pad 26a gradually decreases and the power of the second power transmitting pad 26b gradually increases. The power decrease rate of the first power transmitting pad 26a matches or corresponds to the power increase rate of the second power transmitting pad 26b to provide uniform power at the overlapping region 64 of the first power transmitting pad 26a and the second power transmitting pad 26b.

At X4, the first power transmitting pad 26a turns off in order to conserve power, and the second power transmitting pad 26b maintains a constant power output until X5, at which point the above process repeats with respect to the third power transmitting pad 26c at X6-X8. Although only three power transmitting pads 26 are shown, it should be appreciated that the above steps may be repeated for each power transmitting pad 26 in the power transmitting assembly 34 such that the power transmitting pads 26 are sequentially operated. Power output remains uniform between adjacent power transmitting pads 26.

It is contemplated that any number of power transmitting pads 26 may be employed and each having any suitable geometry, such as including a curve or multiple curves formed in the sides 42, 44 thereof between the rear end 40 and the forward end 38. However, when the power transmitting pad 26 includes a curvature formed therein, each side 42, 44 of the power transmitting pad 26 has an identical curvature to maintain a constant width of the power transmitting pad 26 and, thus, the magnetic field provided.

Figure 4:
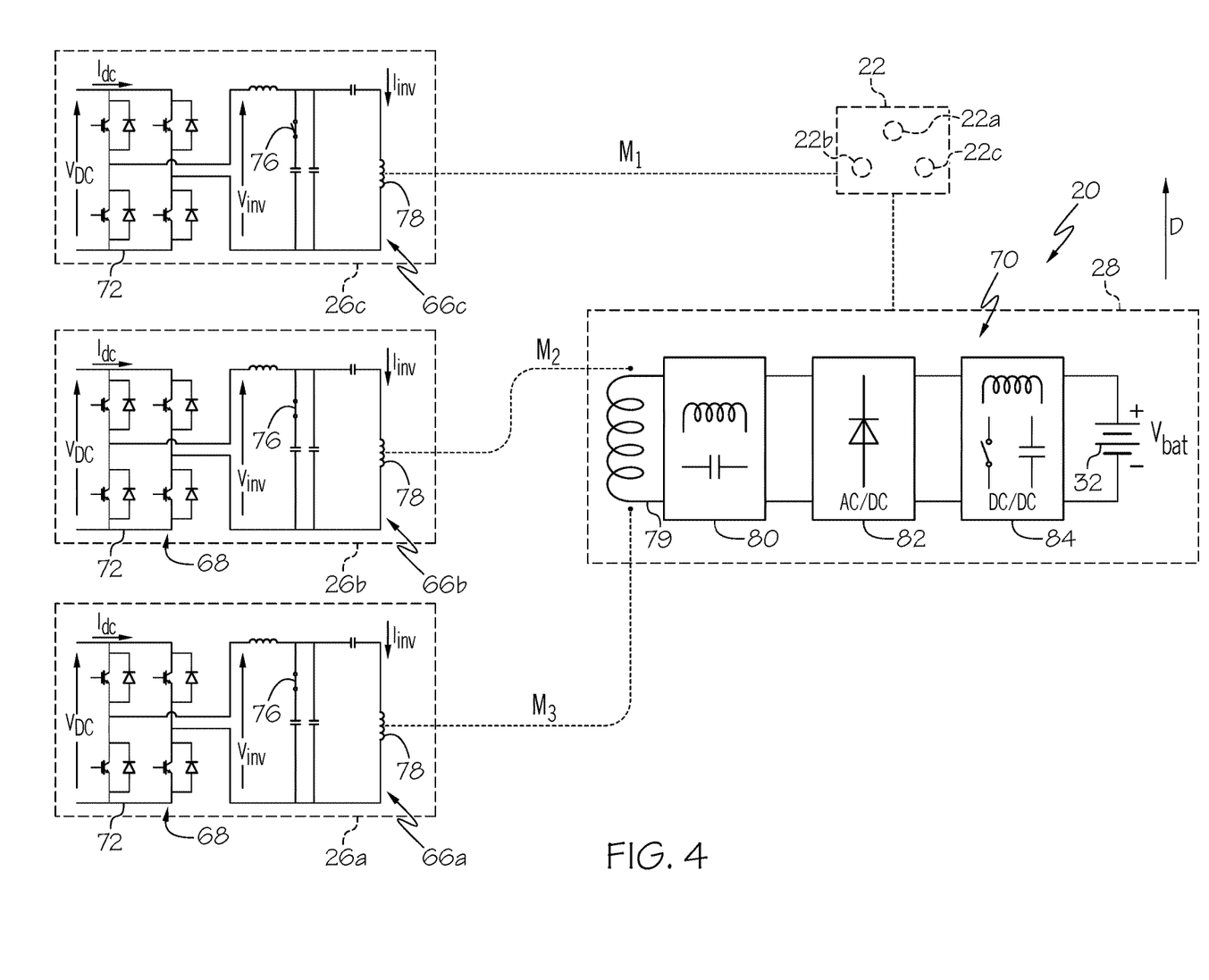
FIG. 4 schematically depicts a transmitter circuit of the power transmitting system communicating with a plurality of magnetic sensors and a receiver circuit of the power receiving system according to one or more embodiments shown and described herein.

As shown in FIG. 4, a diagram illustrates a non-limiting example of a plurality of transmitter circuits 66a, 66b, 66c of each of a plurality of power transmitting pads 26a, 26b, 26c, respectively, arranged in the driving direction D and in communication with the power receiving system 20. The transmitter circuits 66a, 66b, 66c are identical in structure and, thus, may be referred to generally as the transmitter circuit 66. It should be appreciated that the transmitter circuit 66 is operable between the misalignment estimation mode and the power transmitting mode. As shown, the transmitter circuits 66a, 66b are shown in the power transmitting mode and the transmitter circuit 66c is shown in the misalignment estimation mode. When in the misalignment estimation mode, the transmitter circuit 66, such as transmitter circuit 66c, generates a magnetic field detected by the magnetic sensors 22 for estimating lateral misalignment and/or the vertical offset. When in the power transmitting mode, the transmitter circuit 66, such as transmitter circuits 66a, 66b, generates a magnetic field for transmitting power to the power receiving pad 28.

The transmitter circuit 66 includes components well known to those of ordinary skill in the art to wirelessly transmit power, such as a full-bridge inverter 72 and a coil 78, e.g., the coil 36 of the power transmitting pad 26. It should be understood that the transmitter circuit 66 is shown for illustrative purposes only and are not limited thereto. The transmitter circuit 66 may also include a relay 76 operable between an open state and a closed state. When in the misalignment estimation mode, the relay 76 of the transmitter circuit 66 is switched to the open state to tune the transmitter circuit 66, such as the transmitter circuit 66c, to a suitable frequency for estimating misalignment, as disclosed herein. When in the power transmitting mode, the relay 76 of the transmitter circuit 66, such as the transmitter circuits 66a, 66b, is switched to the closed state to tune the transmitter circuit 66 to a suitable frequency for transmitting power, as disclosed herein. In some embodiments, the transmitter circuit 66 operates at a first frequency when in the misalignment estimation mode and the transmitter circuit 68 operates at a second frequency when in the power transmitting mode, which is different from the first frequency to avoid interference. As noted herein, for example, the transmitter circuit 66 may operate between 4 kHz and 5 kHz when in the misalignment estimation mode, and the transmitter circuit 66 may operate between 70 kHz and 90 kHz when in the power transmitting mode.

As shown in FIG. 4, an example situation is illustrated in which the power receiving system 20 is passing over each of the power transmitting pads 26a, 26b, 26c. The forward-most power transmitting pad 26c is in the misalignment estimation mode, which results in a mutual inductance M1 generated between the coil 78 of the transmitter circuit 66c and the magnetic sensors 22. At the same time, the power transmitting pads 26a, 26b, which are rearward of the power transmitting pad 26c in the driving direction D, are operating in the power transmitting mode. A mutual inductance M2 is generated between the coil 78 of the power transmitting pad 26b and a coil 79 of the power receiving pad 28. Similarly, a mutual inductance M3 is generated between the coil 78 of the power transmitting pad 26a and the coil 79 of the power receiving pad 28. Thus, it should be appreciated that the transmitter circuit 66, and thus the respective power transmitting pad 26, initially operates in the misalignment estimation mode in order to estimate lateral misalignment before switching to the power transmitting mode to transmit power to the power receiving pad 28. Once the power transmitting pad 26 determines that the vehicle 10 has moved onto a subsequent power transmitting pad, the power transmitting pad 26 turns off in order to conserve power. The transmitter circuit 66 uses substantially less power when in the misalignment estimation mode than when in the power transmitting mode. Thus, by operating in the misalignment estimation mode and subsequently switching to the power transmitting mode, power is saved by not continuously operating the power transmitting pad 26 to transmit power when the power receiving pad 28 is not positioned over the power transmitting pad 26.

With respect to the receiver circuit 70 of the vehicle 10, the receiver circuit 70 is configured to receive power from the power receiving pad 28. In some embodiments, the power is transferred from the power receiving pad 28 to the battery 32 of the vehicle 10. As such, the receiver circuit 70 includes components known to those of ordinary skill in the art to wirelessly receive and transfer power, such as the coil 79, e.g., an inductive coil of the power receiving pad 28, a compensation network 80, a full bridge rectifier 82, and a DC-DC converter 84. In other embodiments, the power receiving pad 28 may bypass the battery 32 of the vehicle 10 and be used to operate the electrical components of the vehicle 10 directly without any intermediate power storage device.

Figure 5A:
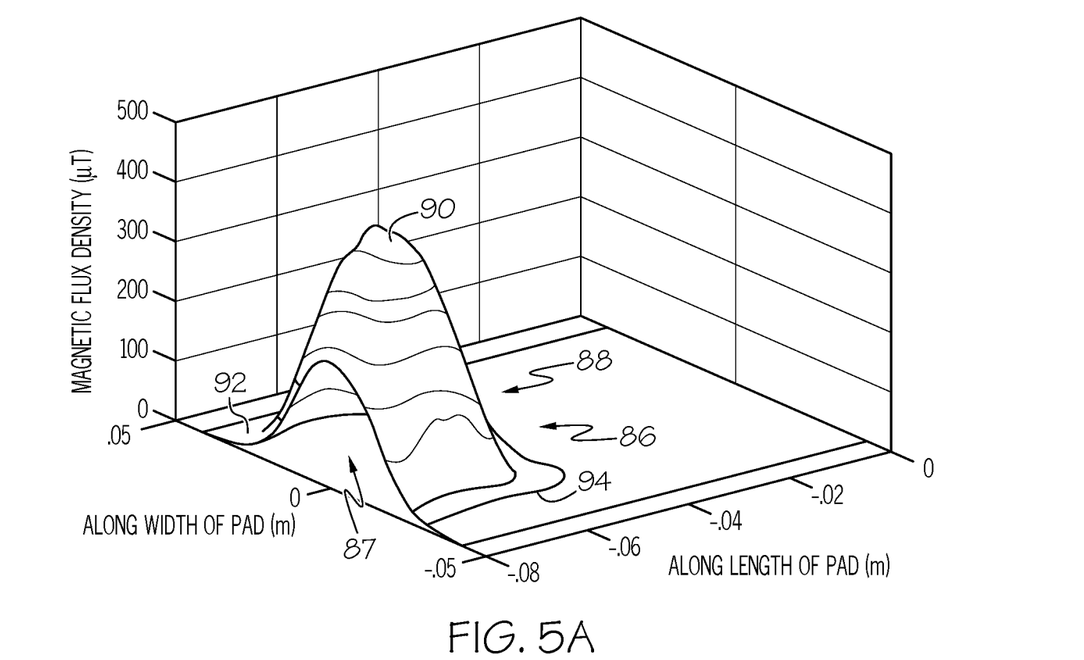
FIG. 5A schematically depicts a 3D graph of the X-component of a magnetic flux density of a magnetic field produced by the power transmitting system according to one or more embodiments shown and described herein.
Figure 5B:
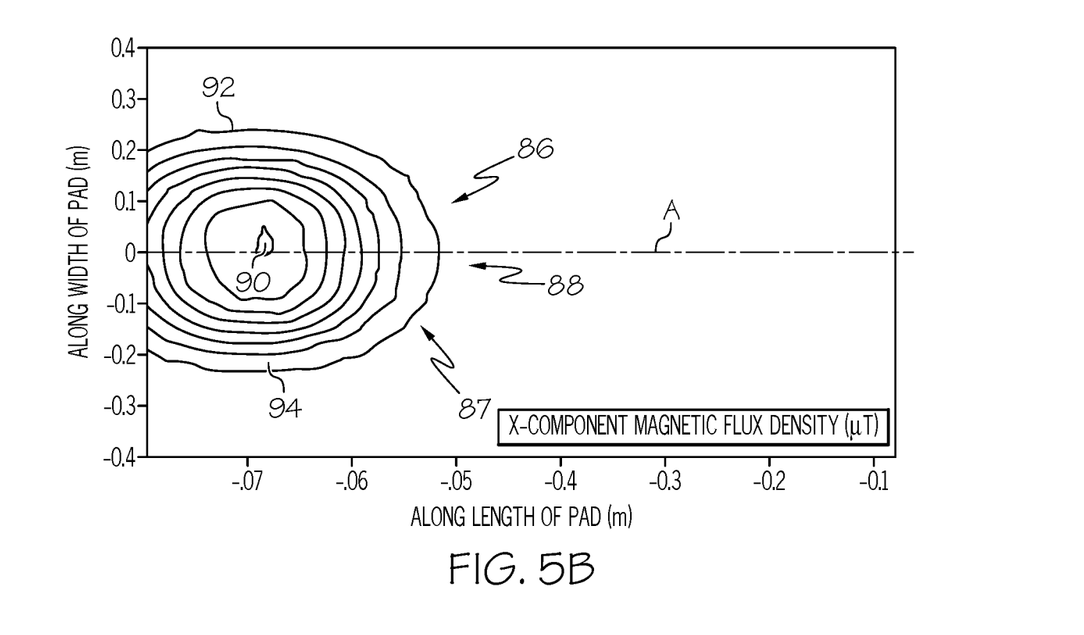
FIG. 5B schematically depicts a 2D contour plot of the X-component of the magnetic flux density of the magnetic field produced by the power transmitting system according to one or more embodiments shown and described herein.

As shown in FIGS. 5A and 5B, an X-component 86 of a magnetic flux density 87 of the magnetic field 88 provided by the power transmitting pad 26 during the misalignment estimation mode is illustrated. Specifically, FIGS. 5A and 5B illustrate the X-component 86 of the magnetic flux density 87 of the magnetic field 88 and indicate an X-peak 90. The X-peak 90 corresponds to the rear end 40 of the power transmitting pad 26 and, therefore, indicates when the vehicle 10 has reached the beginning of the power transmitting pad 26. As the magnetic flux density 87 extends in opposite directions along the width of the power transmitting pad 26, the X-component 86 of the magnetic flux density 87 decreases toward 0 at a left region 92 and a right region 94 of the magnetic flux density 87. Similarly, the X-component 86 of the magnetic flux density 87 decreases toward 0 as the magnetic flux density 87 extends forward in the X-direction along a length of the power transmitting pad 26. However, it should be appreciated that, although only a rear portion of the magnetic flux density 87 of the power transmitting pad 26 is illustrated, the magnetic flux density 87 will include an X-peak, similar to the X-peak 90, at the forward end 38 of the power transmitting pad 26. By detecting the X-peak 90, as well as the X-peak provided at the forward end 38 of the power transmitting pad 26, the speed of the vehicle 10 can be estimated based on a known length of the power transmitting pad 26. This can facilitate more efficient transitioning from the misalignment estimation mode to the power transmitting mode.

Figure 6A:
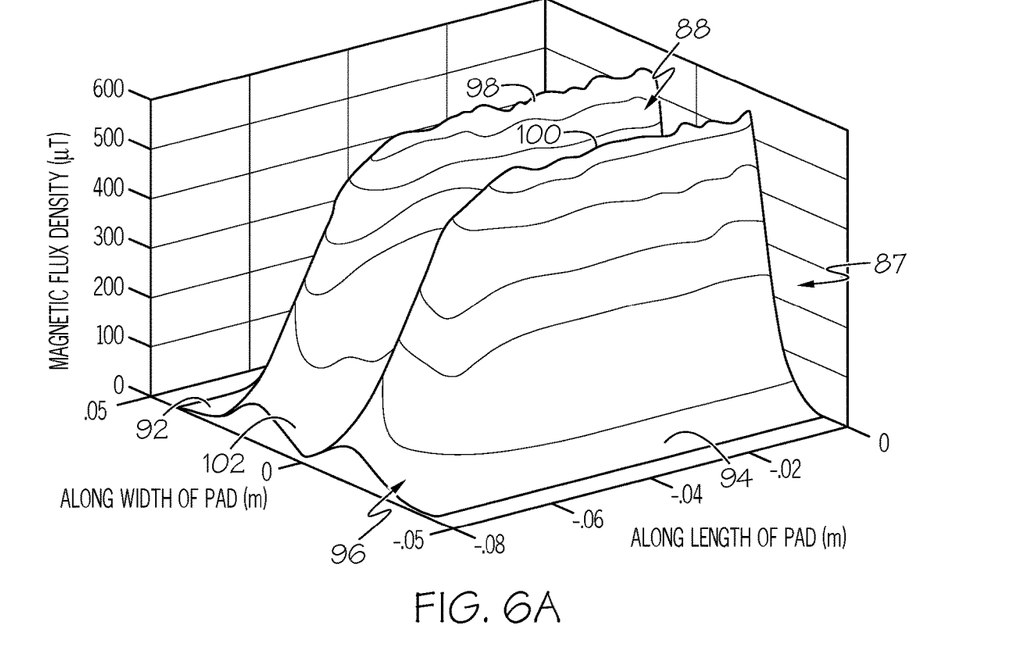
FIG. 6A schematically depicts a 3D graph of the Y-component of the magnetic flux density of the magnetic field produced by the power transmitting system according to one or more embodiments shown and described herein.
Figure 6B:
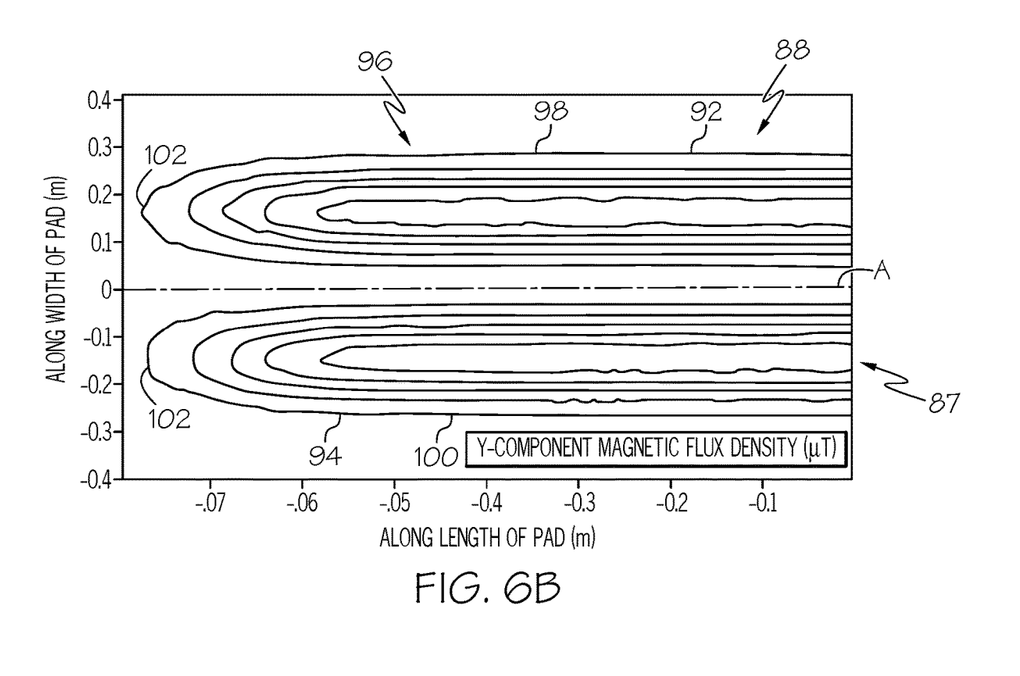
FIG. 6B schematically depicts a 2D contour plot of the Y-component of the magnetic flux density of the magnetic field produced by the power transmitting system according to one or more embodiments shown and described herein.

As shown in FIGS. 6A and 6B, the Y-component 96 of the magnetic flux density 87 provided by the power transmitting pad 26 is illustrated. Specifically, FIGS. 6A and 6B illustrate the Y-component 96 of the magnetic flux density 87 of the magnetic field 88 and indicate a first Y-peak 98 and a second Y-peak 100. The first Y-peak 98 corresponds to the first side 42 of the power transmitting pad 26, and the second Y-peak 100 corresponds to a second side 44 of the power transmitting pad 26. Thus, the pair of Y-peaks 98, 100 are formed on opposite sides 42, 44 of the longitudinal axis of the power transmitting pad 26 in the Y-direction or the width direction. As the magnetic flux density 87 extends in opposite directions from a center of the magnetic flux density 87, the magnitude of the Y-component 96 of the magnetic flux density 87 initially increases toward the first Y-peak 98 and the second Y-peak 100. As the magnetic flux density 87 continues to extend in opposite directions, the magnitude of the Y-component 96 of the magnetic flux density 87 decreases toward 0 at the left region 92 and the right region 94 of the magnetic flux density 87. As shown, the magnitude of the Y-component 96 of the magnetic flux density 87 is greater along a center of each of the Y-peaks 98, 100 and decreases toward a rear region 102 of each of the magnetic flux density 87, which corresponds to the rear end 40 of the power transmitting pad 26. However, similar to FIGS. 5A and 5B, only a rear portion of the magnetic flux density 87 of the power transmitting pad 26 is illustrated.

It should be appreciated that the X-component of the magnetic flux density 87 and the Y-component of the magnetic flux density 87 may each be used individually or in combination to estimate the lateral misalignment and the vertical offset of the power receiving pad 28 relative to the magnetic axis A of the power transmitting pad 26. Specifically, in some embodiments, each magnetic sensor 22 collects data regarding at least one of the X-component and the Y-component. Thus, the lateral misalignment and the vertical offset may each be estimated, via the artificial neural network, discussed in more detail herein, by comparing and analyzing data provided by each magnetic sensor 22. In some embodiments, only one of the X-component and the Y-component of the detected magnetic field 88 of the power transmitting pad 26 may be relied on.

Figure 7:
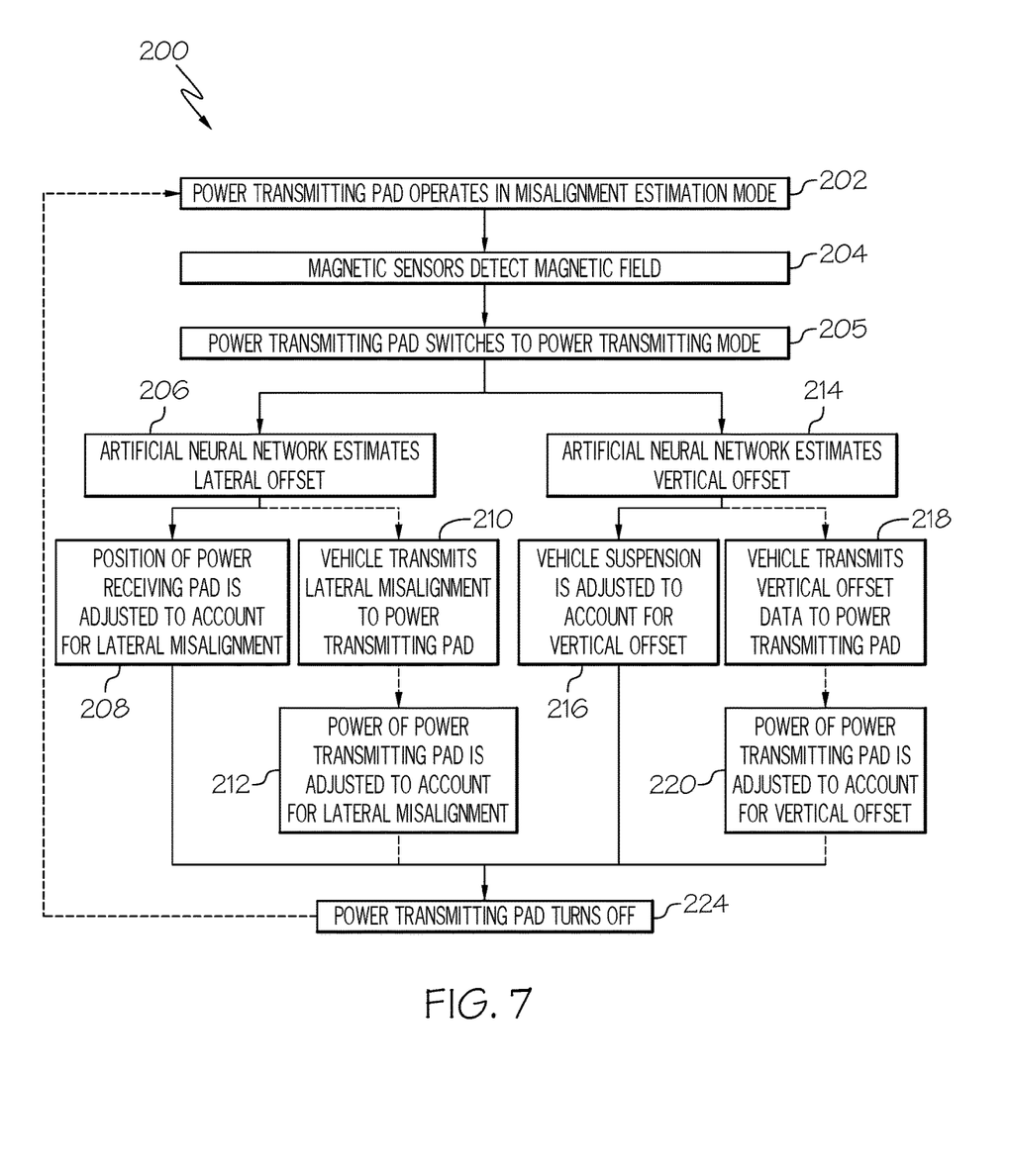
FIG. 7 depicts a flowchart of the operation of the power transmitting system and the power receiving system according to one or more embodiments shown and described herein.

Referring now to FIG. 7, a method 200 is shown for estimating the lateral misalignment and the vertical offset of the vehicle 10 with respect to the power transmitting pad 26. At block 202, the power transmitting pad 26 is activated to operate in the misalignment estimation mode, for example, by energizing the power transmitting pad 26 and opening the relay 76 in the transmitter circuit 66. Until this point, the power transmitting pad 26 may be deactivated to save power. In some embodiments, the power transmitting pad 26 may be activated by receiving a signal from the server 60, which may be in communication with the vehicle 10, directly or indirectly through one or more network connections.

At block 204, the vehicle 10 passes over the power transmitting pad 26, which is operating in the misalignment estimation mode, such that the magnetic sensors 22 of the vehicle 10 detect the magnetic field of the power transmitting pad 26. The detection of the magnetic field is utilized for estimating lateral misalignment and/or the vertical offset, as discussed in more detail herein.

At block 205, the power transmitting pad 26 is instructed to switch to the power transmitting mode to transmit power from the power transmitting pad 26 to the power receiving pad 28. In doing so, the relay 76 of the transmitter circuit 66 closes to switch the power transmitting pad 26 to the power transmitting mode.

At block 206, a trained artificial neural network of the power receiving system 20 estimates the lateral misalignment of the vehicle 10 with regard to the power receiving pad 28 and the power transmitting pad 26 based on data received from the magnetic sensors 22 with respect to the magnetic field. The artificial neural network is initially trained by providing a number of test data as inputs. The inputs may include example detected magnitudes of the magnetic field measured by the magnetic sensors 22, example vehicle speeds, and example ground clearances. In some embodiments, the vehicle speed may be obtained by the measurements of the magnetic sensor 22 passing over the power transmitting pads 26. Alternatively, the vehicle speed may also be obtained by communicating with the vehicle ECU (not shown). In some embodiments, the vehicle ground clearance may be obtained by installing a sensor on the bottom surface 18 of the vehicle 10. In other embodiments, the vehicle ground clearance may be obtained by some other preexisting system in the vehicle 10.

The artificial neural network extracts features based on the inputted data to identify patterns and, as a result, outputs predicted lateral misalignments associated with the inputted magnetic field magnitudes, vehicle speeds, and vertical clearances. The artificial neural network is trained to estimate lateral misalignment by comparing the predicted lateral misalignments associated with the inputs with the actual lateral misalignments associated with the same inputs. The differences between the actual lateral misalignments and the predicted lateral misalignments provide a loss/cost function indicating a degree of error of the artificial neural network. Based on the loss/cost function, the weights and/or parameters of each layer of the artificial neural network are modified during training in order to reduce the loss/cost function. This process is repeated individually or with a subset of inputs for each of the inputs to repeatedly minimize the loss/cost function. This results in a trained module of the artificial neural network that may be deployed within the power receiving system 20 to estimate the lateral misalignment between the power receiving pad 28 and the power transmitting pad 26. The artificial neural network may be provided in a computing device of the vehicle 10, a processor of the power receiving system 20, in a remote server that communicates with either the vehicle 10 or the power transmitting pads 26, edge servers along the roadway, or the like.

Based on the estimation of the lateral misalignment by the trained artificial neural network, the position of the power receiving pad 28 may be adjusted at block 208 to account for the lateral misalignment while the power transfer pad 26 is in the power transmitting mode. This ensures that the power receiving pad 28 on the vehicle 10 is aligned with the power transmitting pad 26 to improve the power transfer to the vehicle 10. In some embodiments, the vehicle 10 may include a steering module in communication with the power receiving system 20 to automatically adjust the steering of the vehicle 10. In some embodiments, a notification may be provided to the driver of the vehicle 10, such as a visual or auditory notification, via an output device 304 (FIG. 8), such as an entertainment display system, of the vehicle 10. The notification may indicate in which direction and how much the vehicle 10 should be adjusted to align the power receiving pad 28 with the power transmitting pad 26. In other embodiments, it is contemplated that the position of the power receiving pad 28 with respect to the bottom surface 18 of the vehicle 10 may be adjusted either manually or automatically to align with the power transmitting pad 26. For example, the power receiving pad 28 may be located on a track system 29 (FIG. 1), or actuators may be provided for mechanically adjusting the position of the power receiving pad 28 in the vehicle lateral direction. When done automatically, this avoids the need for disrupting the driver and/or repositioning the vehicle 10 relative to the road.

In some embodiments, the power provided by the power transmitting pad 26 may be adjusted to account for a lateral misalignment of a vehicle 10, thereby eliminating the need to adjust the position of the vehicle 10 or the power receiving pad 28. For example, at block 210, the vehicle 10 transmits a signal regarding the lateral misalignment of the vehicle 10 to the power transmitting pad 26 via the vehicle communication device 30 either directly to the pad communication device 54 or indirectly via the server 60 or other network connection. At block 212, the power transmitting pad 26 receives the signal regarding the lateral misalignment of the vehicle 10 and either reduces or increases the power provided by the power transmitting pad 26, thereby increasing or decreasing the magnitude of the magnetic field to account for the lateral misalignment. Once the vehicle 10 passes the power transmitting pad 26, the power transmitting pad 26 is turned off at block 224 until it is instructed to activate into the misalignment estimation mode again. In some embodiments, the power transmitting pad 26 communicates with other power transmitting pads 26 within the power transmitting assembly 34 in the driving direction D so that subsequent power transmitting pads can preemptively adjust the parameters of the magnetic field to account for the lateral misalignment of the vehicle 10.

At block 214, the artificial neural network estimates a vertical offset of the vehicle 10 between the power transmitting pad 26 and the power receiving pad 28 in a similar manner as above with respect to the trained artificial neural network estimating the lateral misalignment. It should be appreciated that the artificial neural network that estimates the vertical offset may be the same artificial neural network as that which estimates the lateral misalignment, or it may be a separate artificial neural network. Further, this may be performed simultaneously as the lateral misalignment is estimated or may be done separately. The artificial neural network extracts features based on the inputted data, as discussed above, to identify patterns and, as a result, outputs predicted vertical offsets associated with the inputted magnetic field magnitudes, vehicle speeds, and vertical clearances. The artificial neural network is trained to estimate a vertical offset by comparing the actual vertical offset associated with the inputs with the predicted vertical offset associated with the same inputs. The differences between the actual vertical offsets and the predicted vertical offsets provide an error or a loss/cost function. Based on the loss/cost function, the weights and/or parameters of each layer of the artificial neural network are modified in order to reduce the loss/cost function. This process is repeated individually or with a subset of inputs for each of the inputs to repeatedly minimize the loss/cost function. This results in a trained module of the artificial neural network that may be deployed within the power receiving system 20 to estimate the vertical offset between the power receiving pad 28 and the power transmitting pad 26.

Based on the estimated vertical offset, the position of the power receiving pad 28 relative to the power transmitting pad 26 may be adjusted. In some embodiments, at block 216, the vehicle suspension 27 (FIG. 1) is adjusted to increase or decrease a distance between the power receiving pad 28 and the power transmitting pad 26 to more efficiently position the power receiving pad 28 relative to the magnetic field of the power transmitting pad 26. In some embodiments, the vehicle suspension 27 is adjusted automatically. In other embodiments, a notification is sent to the driver of the vehicle 10. This notification may be included with the same notification provided to the driver regarding the lateral misalignment of the vehicle 10. The driver may then adjust the vehicle suspension 27 manually. In some embodiments, the position of the power receiving pad 28 relative to the vehicle 10 may be mechanically adjusted in a vehicle vertical direction to increase or decrease the distance between the power receiving pad 28 and the power transmitting pad 26. Adjusting the vertical position of the power receiving pad 28 may be done automatically or manually by adjusting the position of the track system 29 (FIG. 1) or actuators. When done automatically, this avoids the need for disrupting the driver and/or adjusting the vehicle suspension 27 of the vehicle 10.

In some embodiments, the power provided by the power transmitting pad 26 may be adjusted to account for a vertical offset of a vehicle 10, thereby eliminating the need to adjust the position of the vehicle 10 or the power receiving pad 28. For example, at block 218, the vehicle 10 transmits a signal regarding the vertical offset of the vehicle 10 to the power transmitting pad 26 via the vehicle communication device 30 either directly to the pad communication device 54 or indirectly via the server 60 or other network connection. At block 220, the power transmitting pad 26 receives the signal regarding the vertical offset of the vehicle 10 and either reduces or increases the power provided by the power transmitting pad 26, thereby increasing or decreasing the magnitude of the magnetic field to account for the vertical offset. Doing so places the power receiving pad 28 within an optimal range of the magnetic field to improve the power transfer to the power receiving pad 28. Once the vehicle 10 passes the power transmitting pad 26, the power transmitting pad 26 is turned off at block 224 until it is instructed to activate into the misalignment estimation mode again. In some embodiments, the power transmitting pad 26 communicates with other power transmitting pads 26 within the power transmitting assembly 34 in the driving direction D so that subsequent power transmitting pads can preemptively adjust the parameters of the magnetic field to account for the lateral misalignment and/or the vertical offset of the vehicle 10.

As noted herein, the power received by the power receiving pad 28 may be used to recharge the battery 32 of the vehicle 10 or may be used to power electric components of the vehicle 10 directly. It should be appreciated that when the power is used to power the vehicle 10 directly, the size of the battery 32 may be reduced or eliminated entirely.

Figure 8:
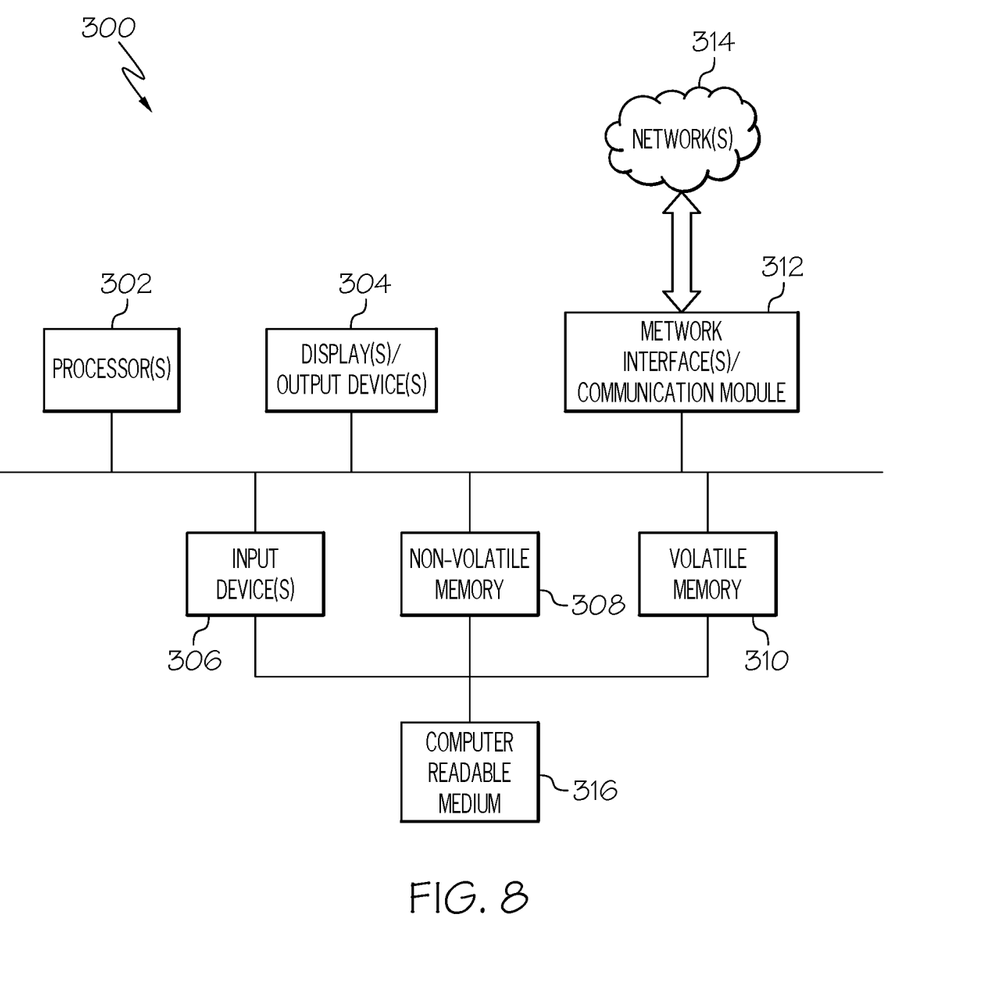
FIG. 8 depicts a block diagram illustrating computing hardware utilized in one or more devices for implementing various systems and processes according to one or more embodiments shown and described herein.

Turning to FIG. 8, a block diagram illustrates an exemplary computing environment 300 through which embodiments of the disclosure can be implemented, such as, for example, the transmitter circuit 66 as depicted in FIG. 4 and/or any subcomponents therein, along with any other computing device depicted in any of FIGS. 1-4. The exemplary computing environment 300 may include non-volatile memory 308 (ROM, flash memory, etc.), volatile memory 310 (RAM, etc.), or a combination thereof. In some embodiments, the at least one processor 302 is coupled to non-transitory memory such as the non-volatile memory 308 and/or volatile memory 310. The exemplary computing environment 300 may utilize, by way of non-limiting example, RAM, ROM, cache, fiber optics, EPROM/Flash memory, CD/DVD/BD-ROM, hard disk drives, solid-state storage, optical or magnetic storage devices, diskettes, electrical connections having a wire, any system or device that is of a magnetic, optical, semiconductor, or electronic type, or any combination thereof.

The exemplary computing environment 300 can include one or more displays and/or output devices 304, such as monitors, speakers, headphones, projectors, wearable-displays, and/or holographic displays, for example. As discussed hereinabove, the driver of the vehicle 10 may receive the notification indicating the lateral misalignment and/or the vertical offset of the vehicle 10 with respect to the power transmitting pads 26 via the display and/or output devices 304. The exemplary computing environment 300 may further include one or more input devices 306 which can include, by way of example, any type of mouse, keyboard, disk/media drive, memory stick/thumb drive, memory card, pen, joystick, gamepad, touch-input device, biometric scanner, voice/auditory input device, motion-detector, camera, scale, etc.

A network interface 312, which may include the vehicle communication device 30, can facilitate communications over one or more networks 314 via wires, via a wide area network, via a local area network, via a personal area network, via a cellular network, via a satellite network, etc. Suitable local area networks may include wired Ethernet and/or wireless technologies such as, for example, Wi-Fi. Suitable personal area networks may include wireless technologies such as, for example, IrDA, Bluetooth, Wireless USB, Z-Wave, ZigBee, and/or other near-field communication protocols. Suitable personal area networks may similarly include wired computer buses such as, for example, USB and FireWire. Suitable cellular networks include, but are not limited to, technologies such as LTE, WiMAX, UMTS, CDMA, and GSM. The exemplary computing environment 300 may include one or more network interfaces 312 to facilitate communication with one or more remote devices, which may include, for example, client and/or server devices, such as the server in communication with the power transmitting system 24. A network interface 312 may also be described as a communications module, as these terms may be used interchangeably. Network interface 312 can be communicatively coupled to any device capable of transmitting and/or receiving data via the one or more networks 314, which may correspond to any computing device depicted in any of FIGS. 1-4, by way of non-limiting example.

The network interface 312 can include a communication transceiver for sending and/or receiving any wired or wireless communication. For example, the network interface 312 may include an antenna, a modem, LAN port, Wi-Fi card, WiMax card, mobile communications hardware, near-field communication hardware, satellite communication hardware, and/or any wired or wireless hardware for communicating with other networks and/or devices.

A computer-readable medium 316 may comprise a plurality of computer-readable mediums, each of which may be either a computer-readable storage medium or a computer-readable signal medium. A computer-readable medium 316 may reside, for example, within an input device 306, nonvolatile memory 308, volatile memory 310, or any combination thereof. A computer-readable storage medium can include tangible media that is able to store instructions associated with, or used by, a device or system. A computer-readable storage medium includes, by way of non-limiting examples: RAM, ROM, cache, fiber optics, EPROM/Flash memory, CD/DVD/BD-ROM, hard disk drives, solid-state storage, optical or magnetic storage devices, diskettes, electrical connections having a wire, or any combination thereof. A computer-readable storage medium may also include, for example, a system or device that is of a magnetic, optical, semiconductor, or electronic type. Computer-readable storage media exclude propagated signals and carrier waves.

From the above, it is to be appreciated that defined herein is a system for training and testing of an artificial neural network in conjunction with a vehicle including a plurality of magnetic sensors to estimate lateral misalignment and/or the vertical offset of a vehicle with respect to a power receiving pad based on a detected magnetic field produced by an inductive charging system. Estimating the lateral misalignment and vertical offset of the vehicle allows the position of the vehicle and/or the position of the power receiving pad on the vehicle to be adjusted to optimize power transfer to the vehicle.

It is noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

It is noted that the terms "substantially" and "about" and "approximately" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
    a power receiving pad for wirelessly receiving power from a first power transmitting pad;
    a plurality of magnetic sensors for measuring a magnetic field of a second power transmitting pad and obtaining magnetic field data;
    one or more processors; and
    one or more memory modules comprising a non-transitory computer-readable medium storing computer-readable instructions that, when executed by the one or more processors, cause the one or more processors to:
        receive the magnetic field data from the plurality of magnetic sensors;
        estimate a lateral misalignment of the power receiving pad with respect to a magnetic axis of the second power transmitting pad;
        decrease power output of the first power transmitting pad at a forward end thereof at a first rate; and
        increase power output of the second power transmitting pad at a rear end thereof at a second rate corresponding to the first rate, the forward end of the first power transmitting pad overlaps the rear end of the second power transmitting pad at an overlapping region to provide uniform power across the first power transmitting pad and the second power transmitting pad.

2. The vehicle of claim 1, wherein the lateral misalignment is estimated by an artificial neural network.

3. The vehicle of claim 1, wherein the vehicle includes at least three magnetic sensors located proximate a front end of the vehicle.

4. The vehicle of claim 3, wherein the at least three magnetic sensors are arranged to detect an X-component and a Y-component of the magnetic field.

5. The vehicle of claim 1, wherein the computer-readable instructions further cause the one or more processors to estimate a vertical offset between the power receiving pad and the second power transmitting pad.

6. The vehicle of claim 5, further comprising a vehicle suspension configured to be adjusted based on the estimated vertical offset.

7. The vehicle of claim 1, further comprising a display device for indicating the lateral misalignment.

8. A power transmitting system for dynamic power transfer comprising:
    a plurality of power transmitting pads;
    one or more processors; and
    one or more memory modules comprising non-transitory computer readable medium storing computer-readable instructions that, when executed by the one or more processors, cause the one or more processors to:
        receive magnetic field data detected by a plurality of magnetic sensors of a vehicle detecting a magnetic field of the plurality of power transmitting pads;
        detect a position of the vehicle relative to the magnetic field;
        sequentially activate the plurality of power transmitting pads based on the position of the vehicle relative to the magnetic field
        decrease power output of a first power transmitting pad of the plurality of power transmitting pads at a forward end thereof at a first rate; and increase power output of a second power transmitting pad of the plurality of power transmitting pads at a rear end thereof at a second rate corresponding to the first rate, the forward end of the first power transmitting pad overlaps the rear end of the second power transmitting pad at an overlapping region to provide uniform power across the first power transmitting pad and the second power transmitting pad.

9. The power transmitting system of claim 8, wherein:
the plurality of power transmitting pads each switch from a misalignment estimation mode to a power transmitting mode,
the plurality of power transmitting pads generate the magnetic field received by the plurality of magnetic sensors of the vehicle when in the misalignment estimation mode, and
the plurality of power transmitting pads transmit power to a power receiving pad of the vehicle when in the power transmitting mode.

10. The power transmitting system of claim 9, wherein the computer-readable instructions, when executed by the one or more processors, cause the one or more processors to estimate a speed of the vehicle.

11. The power transmitting system of claim 9, wherein the plurality of power transmitting pads operates at a first frequency when in the misalignment estimation mode and operates at a second frequency when in the power transmitting mode, the first frequency being different from the second frequency.

12. The power transmitting system of claim 8, wherein the computer-readable instructions, when executed by the one or more processors, cause the one or more processors to adjust a magnitude of the magnetic field of the plurality of power transmitting pads based on an estimated vertical offset between a power receiving pad and the plurality of power transmitting pads.

13. A method for providing dynamic wireless power transfer to a vehicle, the method comprising:
wirelessly receiving power at a power receiving pad of a vehicle from a first power transmitting pad and a second power transmitting pad of a plurality of power transmitting pads;
detecting, using a plurality of magnetic sensors, a magnetic field provided by each of the plurality of power transmitting pads to obtain magnetic field data;
estimating a lateral misalignment of the power receiving pad with respect to a magnetic axis of the plurality of power transmitting pads using the magnetic field;
adjusting a position of the vehicle to account for the lateral misalignment of the power receiving pad;
decreasing power output of a first power transmitting pad of the plurality of power transmitting pads at a forward end thereof at a first rate; and
increasing power output of a second power transmitting pad of the plurality of power transmitting pads at a rear end thereof at a second rate corresponding to the first rate,
wherein the forward end of the first power transmitting pad overlaps the rear end of the second power transmitting pad at an overlapping region to provide uniform power across the first power transmitting pad and the second power transmitting pad.

14. The method of claim 13, further comprising estimating a vertical offset of the power receiving pad with respect to the plurality of power transmitting pads using the magnetic field.

15. The method of claim 14, further comprising instructing the vehicle to adjust a suspension of the vehicle based on the estimated vertical offset.

16. The method of claim 14, further comprising instructing the plurality of power transmitting pads to adjust a magnitude of the magnetic field based on the estimated vertical offset.

17. The method of claim 13, further comprising:
switching operation of each of the plurality of power transmitting pads from a misalignment estimation mode to a power transmitting mode;
estimating vehicle misalignment when in the misalignment estimation mode; and
transmitting power to the power receiving pad of the vehicle when in the power transmitting mode.

* * * * *

UNITED STATES PATENT AND TRADEMARK OFFICE
CERTIFICATE OF CORRECTION

PATENT NO. : 11,505,077 B2
APPLICATION NO. : 16/885010
DATED : November 22, 2022
INVENTOR(S) : Zeljko Pantic et al.

It is certified that error appears in the above-identified patent and that said Letters Patent is hereby corrected as shown below:

On the Title Page

In page 2, Column 2, item (56), other publications, cite no. 6, before "16 pages.", insert --received January 25, 2018,--.

In the Claims

In Column 16, Line(s) 53, Claim 8, after "comprising", insert --a--.

In Column 16, Line(s) 64, Claim 8, after "magnetic field", insert --;--.

Signed and Sealed this
Third Day of January, 2023

Katherine Kelly Vidal
*Director of the United States Patent and Trademark Office*